United States Patent [19]

Flander

[11] Patent Number: 4,502,739
[45] Date of Patent: Mar. 5, 1985

[54] ROLLER BEARING SEAL

[75] Inventor: Hans Flander, Nuremberg, Fed. Rep. of Germany

[73] Assignee: GMN Georg Muller Nurnberg GmbH, Fed. Rep. of Germany

[21] Appl. No.: 445,421

[22] Filed: Nov. 30, 1982

[30] Foreign Application Priority Data

Dec. 1, 1981 [DE] Fed. Rep. of Germany ....... 3147495

[51] Int. Cl.³ .............................................. F16C 33/78
[52] U.S. Cl. ..................................... 384/481; 384/484
[58] Field of Search .......................... 308/187.1, 187.2; 384/131, 147; 277/105, 212 F, 212 R

[56] References Cited

U.S. PATENT DOCUMENTS

| | | | |
|---|---|---|---|
| 3,350,148 | 10/1967 | Sanguinetti et al. | 308/187.2 |
| 3,414,275 | 12/1968 | Takahashi | 308/187.2 X |
| 3,572,857 | 3/1971 | Hasegawa | 308/187.2 |
| 3,642,335 | 2/1972 | Takahashi et al. | 308/187.2 |

FOREIGN PATENT DOCUMENTS 1014593 12/1965 United Kingdom ............. 308/187.2

Primary Examiner—Stuart S. Levy
Assistant Examiner—Thomas R. Hannon
Attorney, Agent, or Firm—Steinberg & Raskin

[57] ABSTRACT

The roller bearing seal includes a ring-shaped member integrally connected to an outer race of the roller bearing. The ring-shaped member has an outer lip portion that is spaced a predetermined amount from the inner race of the roller bearing so as to provide a gap between the ring shaped seal member and the inner race. Oppositely extending rim portions project from the lip portion in concentric fashion with respect to the lip portion to define respective spaces for accommodating grease layers. The grease layers and the lip portion constitute a seal against the inner race thereby preventing dust or other foreign particles from passing through the grease layers and the lip portion.

7 Claims, 2 Drawing Figures

ROLLER BEARING SEAL

BACKGROUND OF THE INVENTION

This invention relates to roller bearings, and more particularly to a roller bearing with an integrated seal.

Roller bearing seals are generally used to maintain a lubricant securely inside the bearing, and to prevent the penetration of foreign bodies into the bearing.

Roller bearing seals usually include an outer shield or covering and an inner sealing shield, the terms inner and outer referring to their relative axial position. Both kinds of seals are usually attached to the outer race of the bearing so that the inner race can turn relative to the seal. There is often a gap in the seal between the outer shield or covering and the inner race, to furnish the advantage of reduced friction, whereas the inner sealing shield generally makes contact with the inner race to furnish the advantage of greater sealing efficiency.

It is well known that a layer of grease in contact with a lip seal or a gap seal improves the efficiency of the seal. However, when a conventional sealed roller bearing turns at a high speed, it is normally not possible to maintain a thick layer of grease at the seal because the grease has a tendency to become ejected due to centrifugal force. Other known seals have axially circumscribed rims. However, the rims form either a labyrinth gap with the inner race, or they terminate with a sealing lip in contact with, or with no clearance from the inner race.

A problem that is common to these known devices is that in the space between the axial rims or lips and the sealing or inner shields it is not possible for a static layer of grease to form because of the very slight clearance from the inner race. With such a slight gap, the turbulent air currents which form around the rotating inner race break down the neighboring layer of grease, and prevent the build up of a layer of grease in front of the sealing gap. The layer of grease can only fulfill its function as an auxiliary seal if it remains static, and it can only remain static when the distance from the inner sealing shield to the rotating inner race is sufficiently great.

Previous attempts to improve the sealing efficiency of a roller bearing seal have often resulted in an increased amount of friction on the bearing, an unquestionably undesirable result. It is thus desirable to improve the efficiency of the covering and seal shields without increasing the amount of friction imposed on the inner race of a roller bearing due to the presence of such seals.

SUMMARY OF THE INVENTION

Accordingly, it is an object of the invention to provide new and improved roller bearings with an integrated seal.

Another object is to provide new and improved roller bearings with integrated seals that improve the efficiency of the seals without increasing the amount of friction within the bearing.

In accordance with the present invention the roller bearing seal includes a rim portion which circumscribes and is part of an outer sealing portion of the shield, and is at a very slight distance away from the sealing point. Such arrangement makes it possible for a static layer of grease to build up on the inside or the outside of the bearing. This layer of grease increases the efficiency of the seal, without increasing the friction of the bearing. The clearance of the circumscribed rim from the sealing point is chosen so that the contours of the inner race or any of its component parts do not have any effect on the operation of the bearing due to turbulent air currents which could disturb the static layer of grease. Other features and advantages of the invention will be apparent from the following description.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
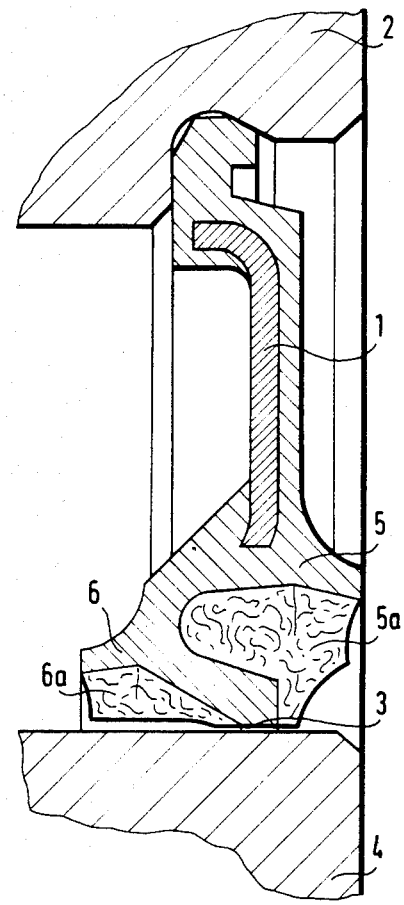
FIG. 1 is a cross sectional view of a sealing shield incorporating one embodiment of the present invention; and, FIG. 2 is a cross sectional view of a sealing shield incorporating another embodiment of the invention.

Referring now to the drawings wherein like reference characters designate identical or corresponding parts throughout the several views, and more particularly to FIG. 1, a roller bearing seal according to the present invention comprises a seal shield 1 secured to an outer bearing race 2 in any suitable known manner. The seal shield 1 has a bore hole which defines a sealing lip at 3 for providing a seal with respect to a rotating inner race 4 when it is in a condition of minimal stress.

An axially circumscribed rim 5, which extends in an outward direction is formed at a predetermined distance from the sealing lip 3, and another rim 6 which extends in an axially inward direction of the bearing is also formed at a predetermined distance from the sealing lip 3. Under this arrangement, layers of grease 5a and 6a are respectively provide between the rims 5 and 6.

The axial rims 5 and 6 have sufficient clearance from the inner race 4 so that any turbulent air currents which form around the inner race 4 when it is turning at high speed will not have a detrimental effect on the layers of grease 5a and 6a.

Figure 2:
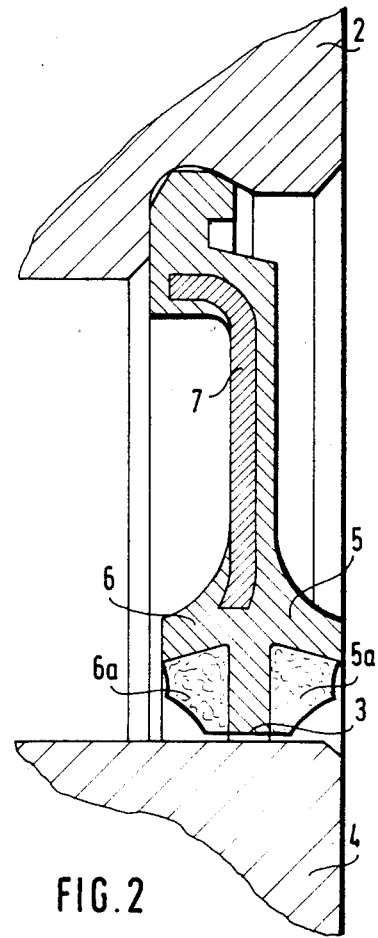

In a further embodiment of the invention as shown in FIG. 2 an outer shield 7 also includes a bore hole which defines a sealing lip at 3. The sealing lip 3 forms a slight radial sealing gap with the inner race 4.

The circumscribed rims 5 and 6 permit the build up of layers of grease 5a and 6a. Particles of grease which move from the inner race 4 in the direction of the sealing lip 3 are urged against the inner static layer of grease 6a before they reach the sealing lip 3, and are contained by this layer of grease. Exterior foreign bodies or particles which might otherwise force themselves into the bearing are either diverted by the external layer of grease 5a or become embedded therein.

Should any external particles pass through the external layer of grease 5a and penetrate the sealing gap at the sealing lip 3 they will still be held back by the inner layer of grease 6a. This sealing off arrangement is especially effective for sealing out fine particles of dust caused by the wearing and abrasion of brushes in electrical motors.

It has been found advantageous to turn the axial rims 5 and 6 slightly inward toward the axis of rotation such that the inner surfaces of the rims 5 and 6 are at an angle of less than 90° to the web of the sealing shield 7. This orientation of the rims 5 and 6 with respect to the web of the sealing shield 7 enables the sealing shield to better retain the layers of grease 5a and 6a, and gives the rims 5 and 6 a key shaped form with respect to the axis of the bearing.

The foregoing invention can be incorporated in an inner sealing shield and an outer shield seal, which seal against a cylindrical inner race. This invention also contemplates sealing shields which seal against inclined surface or grooves on an inner race.

What is claimed is:

1. A seal for a roller bearing having an outer race and an inner race, comprising
   a ring-shaped member having a central axis, said ring-shaped member being integrally connected to the outer race,
   an annular lip portion having a first predetermined inside diameter to provide a predetermined radial gap between said lip portion and said inner race, and
   a first rim portion having an inside surface and sloping toward said central axis, said first rim portion being concentric with said lip portion and extending in a first axial direction away from said lip portion,
   said first rim portion having a free edge portion having a second predetermined inside diameter with respect to said central axis, greater than said first predetermined inside diameter, to define, together with said inner race, a first substantially annular space therebetween for accommodating a first grease layer between said first rim portion and said lip portion,
   said space having a radial dimension over its entire axial length which is substantially greater than said radial gap,
   whereby said first space accommodates a layer of grease forming the first grease layer which is not subject to turbulence during operation of the roller bearing.

2. The seal according to claim 1, further including
   a second rim portion having an inside surface and sloping toward said central axis, said second rim portion being concentric with said lip portion and extending in a second axial direction opposite said first axial direction away from said lip portion,
   said second rim portion having a free edge portion having a third predetermined inside diameter with respect to said central axis, greater than said first predetermined inside diameter, to define, together with said inner race, a second substantially annular space therebetween for accommodating a second grease layer between said second rim portion and said lip portion,
   said second space having a radial dimension over its entire axial length which is substantially greater than said radial gap,
   whereby said second space accommodates a layer of grease forming the second grease layer which is not subject to turbulence during operation of the roller bearing.

3. The seal according to claim 2 wherein said second and third inside diameters are approximately equivalent.

4. The seal according to claim 3 wherein said first and second rim portions are disposed substantially symmetrically with respect to a line passing through said lip portion in a radial direction.

5. The seal according to claim 2 wherein one of said second and third inside diameters is greater than the other of said second and third inside diameters.

6. The seal according to claim 2 wherein one of said first and second spaces is larger than the other of said first and second spaces.

7. The seal according to claim 6, wherein
   one of said first and second rim portions is disposed to one side of a line passing through said lip portion in a radial direction, to define one of said first and second spaces on the same side of the radial line, and
   the other of said first and second rim portions is disposed on the opposite side of the radial line to define at least a portion of the other of said first and second spaces which cuts across the radial line.

* * * * *